United States Patent Office 3,332,949
Patented July 25, 1967

3,332,949
1-PHENYL-4-[2-(2-PYRIDYL)-ETHYL] PIPERAZINES
Frederick K. Kirchner, Bethlehem, N.Y., assignor to Sterling Drug Inc., New York, N.Y., a corporation of Delaware
No Drawing. Continuation of application Ser. No. 237,321, Nov. 13, 1962. This application June 6, 1966, Ser. No. 555,249
5 Claims. (Cl. 260—268)

This application is a continuation of my copending application, Ser. No. 237,321, filed Nov. 13, 1962, which is a continuation-in-part of Ser. No. 34,876, filed June 9, 1960, and both now abandoned.

This invention relates to novel piperazine compounds.

The invention is particularly concerned with 1-phenyl-4-[2-(2-pyridyl-R)ethyl]piperazines, where R is hydrogen or lower-alkyl. In the free base form, these compounds have the structural formula

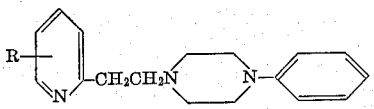

where R has the same meaning indicated above. When R is lower-alkyl, it is preferred that the radicals have from one to about four carbon atoms, for example, methyl, ethyl, isopropyl, n-propyl, n-butyl, sec.-butyl, and the like. The 1-phenyl-4-[2-(2-pyridyl-R)ethyl]piperazines of the invention are the free base forms represented by the above formula and the acid-addition salts of said bases fully equivalent therewith which are obtained by reacting the bases with organic and inorganic acids, such as hydrochloric acid, phosphoric acid, methanesulfonic acid, acetic acid, and the like. The new piperazines contain several basic centers and hence can form acid-addition salts with one or several moles of the inorganic or organic acid.

The preparation of the compounds of the above formula is carried out by heating 1-phenyl-piperazine with the appropriate 2-vinylpyridine in an inert organic solvent, for instance, a lower-alkanol as for example, methanol, ethanol and isopropyl alcohol in the presence of an acid catalyst, preferably acetic acid. The free base obtained can, if desired, be converted to an acid-addition salt.

Although the condensation can be effected over a temperature range of about 50° C. to about 150° C. the best mode for carrying out the reaction consists of selecting a solvent that boils in this range and conducting the reaction at the reflux temperature.

The compounds preparable from 1-phenyl-piperazine and the various 2-vinylpyridines are preferred because of the ease of preparation and ready accessibility of the intermediates as indicated above. However, other alkylpyridines suitable for use in preparing the 1-phenyl-4-[2-(2-pyridyl-R)ethyl]piperazines of the invention can be prepared by reduction of the amide obtained by condensation of the appropriate alkyl 2-pyridyl-R acetate with 1-phenylpiperazine. The alkyl 2-pyridyl-R acetates are prepared by esterification of the lithium salt resulting from the carboxylation of the appropriate α-picolyllithium.

Compounds of this invention which were prepared as described in the following examples were found to be central nervous system depressants having tranquilizing properties without concomitant sedative properties. Thus, at dosages of from 2 to 32 mg./kg. the compounds of the invention produced marked taming, i.e. loss of normal aggressiveness, of monkeys who nevertheless remained alert to external stimuli. The compounds of the invention also were found to have antihistaminic properties at dosages as low as 0.2 mg./kg. in the guinea pig and blood pressure lowering properties at dosages as low as 0.63 mg./kg. in the anesthetized normotensive dog.

The compounds of the invention are also useful in the preparation of certain 1-carbamyl-, 1-substituted-carbamyl-, and 1-substituted-thiocarbamyl-2-[2-(4-piperazinyl)ethyl]piperidines disclosed and claimed in my U.S. Patent 3,133,061 granted May 12, 1964, on application S.N. 237,320 filed November 13, 1962, which is a continuation-in-part of my copending prior application Ser. No. 34,876, filed June 6, 1960. Thus, for example, 1-diethylcarbamyl-2-[2-(4-phenyl-1-piperazinyl)ethyl]piperidine is prepared by reaction of diethylcarbamoyl chloride with 2-[2-(4-phenyl-1-piperazinyl)ethyl]piperidine which in turn is prepared by the hydrogenation of 1-phenyl-4-[2-(2-pyridyl)ethyl]piperazine.

The structure of the compounds of the invention is established by the mode of synthesis and by chemical analysis.

The following examples will illustrate the invention without limiting the latter thereto.

Example 1

(a) *1-phenyl-4-[2-(2-pyridyl)ethyl]piperazine.*—A mixture of 52.5 g. of 2-vinylpyridine, 81 g. of 1-phenylpiperazine and 28.6 ml. of glacial acetic acid in 250 ml. of anhydrous methanol was refluxed on a steam bath for seven hours. The solution was concentrated by distillation under reduced pressure, the concentrate cooled and treated with 35% sodium hydroxide. The basic solution was diluted with water then extracted with benzene. The benzene extracts were dried over potassium carbonate and the benzene removed by distillation. The viscous liquid remaining solidified on standing overnight and was collected by filtration. Recrystallization from n-hexane gave 14.2 g. of white solid. This product, which melted at 60–61° C., was 1-phenyl-4-[2-(2-pyridyl)ethyl]piperazine, having the molecular formula $C_{17}H_{21}N_3$.

(b) *1-phenyl-4-[2-(2-piperidyl)ethyl]piperazine.* — A mixture of 169.1 g. of 1-phenyl-4-[2-(2-pyridyl)-ethyl]piperazine and 450 ml. of glacial acetic acid was hydrogenated over 30 g. of platinum oxide at about 1500 p.s.i. The catalyst was removed by filtration and the filtrate concentrated under reduced pressure. The resultant yellow oil was treated with 300 ml. of 35% sodium hydroxide solution and the suspension extracted several times with ether and the solid removed by filtration. The ether extracts were dried over potassium carbonate, the ether removed by distillation and the residue distilled. After removing 10.5 g. of a liquid, B.P. 170–171° C./1 mm. the residue solidified. The solid was collected by filtration and recrystallized from n-hexane. After drying under reduced pressure there was obtained 69.2 g. of 1-phenyl-4-[2-(2-piperidyl ethyl]piperazine, M.P. 52–56° C., having the molecular formula $C_{17}H_{27}N_3$.

(c) *1 - (N,N - diethylcarbamyl)-2-[2-(4-phenyl-1-piperazinyl)ethyl]piperidine.*—A mixture of 41 g. of 1-phenyl-4-[2-(2-piperidyl)ethyl]piperazine and 12.6 g. of sodium bicarbonate in 100 ml. of dry benzene was placed in a 500 ml. three-necked flask equipped with stirrer, reflux condenser, thermometer and dropping funnel. To the stirred mixture were added dropwise 20.4 g. of diethylcarbamoyl chloride in 50 ml. of benzene and the mixture refluxed for one hour. The solid which separated was removed by filtration and the residue concentrated under reduced pressure. The yellow oil was taken up in a dry benzene-n-hexane mixture, the solid removed by filtration and the filtrate taken up in n-hexane, decanted and the solution concentrated on a steam bath. The small amount of solid was removed by filtration and the filtrate distilled in vacuo. There was thus obtained 10.63 g. of 1-(N,N - diethylcarbamyl)-2-[2-(4-phenyl-1-piperazinyl)

ethyl]piperidine, B.P. 182–185° C./.016 mm., and having the molecular formula $C_{22}H_{36}N_4O$.

The minimum effective hypotensive dose (MEHD) of 1-(N,N - diethylcarbamyl)-2-[2-(4-phenyl-1-piperazinyl) ethyl]piperidine given subcutaneously in the renal hypertensive rat was found to be 0.01 mg./kg. The hypotensive effect lasted for forty-eight hours and the maximum drop in blood pressure was reached in six hours.

*Example 2.—1-phenyl-4-[2-(5-ethyl-2-pyridyl)ethyl] piperazine*

Proceeding in a manner similar to that described in Example 1, a mixture of 95 g. of 5-ethyl-2-vinylpyridine, 116 g. of 1-phenylpiperazine and 41 ml. of glacial acetic acid in 375 ml. of anhydrous methanol was refluxed for nine hours to yield 144 g. of tan solid. This product which was crude 1-phenyl-4-[2-(5-ethyl-2-pyridyl)ethyl]piperazine, was recrystallized from n-hexane to give 125 g. of the purified compound having the molecular formula $C_{19}H_{25}N_3$.

*Example 3.—1-phenyl-4-[2-(6-methyl-2-pyridyl)ethyl] piperazine*

A mixture of 178.5 g. of 6-methyl-2-vinylpyridine and 243 g. of 1-phenylpiperazine in 750 ml. of anhydrous methanol was heated to reflux in a 2 l. three-necked flask equipped with reflux condenser and dropping funnel. Glacial acetic acid (96 g.) was added dropwise with swirling and the mixture then refluxed for nine hours. Proceeding in a manner similar to that described in Example 1 there was obtained 256 g. of off-white solid. The product, which melted at 65–66° C., was 1-phenyl-4-[2-(6-methyl-2-pyridyl)ethyl]piperazine having the molecular formula $C_{18}H_{23}N_3$.

*Example 4*

(a) *1-phenyl-4-[2-(6-ethyl - 2 - pyridyl)acetyl]piperazine.*—A mixture of 50.5 g. of ethyl 6-ethyl-2-pyridylacetate and 46.2 g. of 1-phenylpiperazine was heated at 230° C. for five hours and left standing overnight at room temperature. The mixture was again heated at 230° C. for eight hours then left standing for forty-eight hours. The residue was taken up in 400 ml. of benzene and the benzene extract washed three times with 100 ml. of 25% potassium carbonate solution and the extract dried over potassium carbonate. The dark viscous liquid remaining after concentration of the solution under reduced pressure was distilled in vacuo. There was thus obtained 31 g. of a viscous yellow oil. The oil, which boiled at 169–70° C./0.018 mm., was 1-phenyl-4-[2-(6-ethyl-2-pyridyl)acetyl]piperazine having the molecular formula $C_{19}H_{23}N_3O$.

(b) *1-phenyl-4-[2-(6-ethyl - 2 - pyridyl)ethyl]piperazine.*—To a stirred suspension of 2.47 g. of lithium aluminum hydride in 65 ml. of tetrahydrofuran in a 250 ml. three-necked flask equipped with stirrer, condenser and dropping funnel was added dropwise a solution of 31.1 g. of 1-phenyl-4-[2-(6-ethyl-2-pyridyl)acetyl]piperazine in 65 ml. of tetrahydrofuran. After the addition was complete the mixture was refluxed for one hour then cooled. The metal complex was decomposed by the dropwise addition of 2.5 ml. of water, then 2.5 ml. of 15% sodium hydroxide and finally 7.5 ml. of water. After stirring for twenty minutes 65 ml. of methylene dichloride was added and stirring continued for five minutes. The mixture was filtered and the solvent removed from the filtrate by distillation under reduced pressure. The red liquid residue which solidified upon standing was taken up in hot n-hexane and the mixture cooled. The solid which separated was collected by filtration taken up in benzene then chromatographed on a column of 120 g. of silica gel. The column was first eluted with four portions of benzene, two portions of 20% ether-benzene mixture and then with four portions of chloroform. The third and fourth chloroform eluates gave tan solids which were combined and recrystallized from n-hexane. The 2.1 g. of off-white solid obtained was 1-phenyl-4-[2-(6-ethyl-2-pyridyl) ethyl]piperazine, melting at 90.96° C. and having the molecular formula $C_{19}H_{25}N_3$.

I claim:
1. A compound having the formula

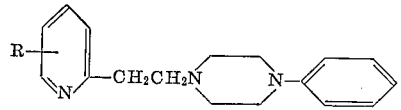

wherein R is a member selected from the group consisting of hydrogen and lower-alkyl having from one to four carbon atoms.
2. 1-phenyl-4-[2-(6-methyl-2-pyridyl)ethyl]piperazine.
3. 1-phenyl-4-[2-(2-pyridyl)ethyl]piperazine.
4. 1-phenyl-4-[2-(5-ethyl-2-pyridyl)ethyl]piperazine.
5. 1-phenyl-4-[2-(6-ethyl-2-pyridyl)ethyl]piperazine.

References Cited

UNITED STATES PATENTS 3,177,219   4/1965   Brossi et al. _____ 260—268

HENRY R. JILES, *Primary Examiner.*

R. BOYD, *Assistant Examiner.*